United States Patent Office 3,287,347
Patented Nov. 22, 1966

3,287,347
WATER-INSOLUBLE NITROTHIAZOLE AZO DYES
Erwin Hahn, Viernheim, and Hans Guenter Wippel and Guenter Lange, Ludwigshafen (Rhine), Germany, assignors to Badische Anilin- & Soda-Fabrik Aktiengesellschaft, Ludwigshafen (Rhine), Germany
No Drawing. Filed Oct. 20, 1964, Ser. No. 405,249
Claims priority, application Germany, Oct. 23, 1963, B 73,976
4 Claims. (Cl. 260—158)

This invention relates to new water-insoluble nitrothiazole azo dyes which are eminently suitable as disperse dyes for dyeing textile material made of, or containing, secondary cellulose acetate in bright blue shades. The dyeings obtained therewith are distinguished by very good fastness, such as light fastness, wet fastness and fastness to gas fume fading, and are capable of being discharged white.

The dyes according to this invention have the general formula:

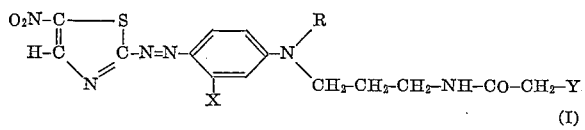

in which:

R denotes an alkyl group having one to four carbon atoms, a hydroxyethyl group, an acetoxyethyl group, a methoxyethyl group or a 2,3-diacetoxypropyl group;
X denotes a hydrogen atom, a chlorine atom, a methyl group or an acetylamino group and
Y denotes a hydrogen atom or a cyano group.

Dyes having the Formula I may be prepared by any conventional way by coupling or condensation.

The dyes according to this invention are preferably obtained by coupling the diazo compound of an amine having the formula:

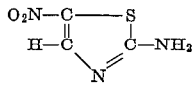

with a coupling component having the formula:

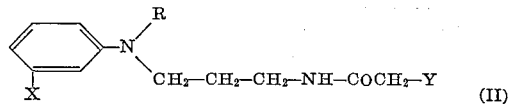

in which R, X and Y have the meanings given above.

Examples of coupling components suitable for the production of the new dyes are as follows:

N-methyl-N-acetaminopropylaniline,
N-methyl-N-acetaminopropyl-m-toluidine,
N-ethyl-N-acetaminopropyl-m-toluidine,
N-butyl-N-acetaminopropylaniline,
N-butyl-N-cyanoacetaminopropylaniline,
N-butyl-N-acetaminopropyl-m-toluidine,
N-acetoxyethyl-N-acetaminopropyl-m-toluidine,
N-hydroxyethyl-N-acetaminopropyl-m-toluidine,
N-methyl-N-acetaminopropyl-m-chloroaniline,
N-diacetoxypropyl-N-acetaminopropyl-m-toluidine,
and N-acetoxyethyl-N-acetaminopropyl-N'-acetyl-m-phenylene diamine.

The said coupling components are prepared in conventional ways, for example by reduction of the corresponding cyanoethylanilines in an acid anhydride, preferably acetic anhydride.

Diazotization and coupling are carried out by conventional methods.

The dyes obtainable according to this invention are eminently suitable, particularly in finely divided form, for dyeing cellulose acetate. They may also be used for dyeing textile material or linear polyesters and polyamides. The dyeings obtained are distinguished by good wet fastness and resistance to high temperatures.

The invention is further illustrated by the following examples in which parts and percentages are by weight, unless otherwise stated. Parts by volume bear the same relation to parts by weight as the liter (S.T.P.) to the kilogram.

Example 1

50 parts of a mixture of anhydrous acetic acid and propionic acid (17:3) is allowed to flow at 0° to 5° C. into a mixture of 14 parts of nitrosylsulfuric acid (having a content of 13.1% of dinitrogen trioxide) and 14 parts of concentrated sulfuric acid and then at 0° to 5° C. 7.25 parts of 2-amino-5-nitro-1,3-thiazole is added. Another 50 parts of the said mixture of acetic and propionic acids is added, the whole stirred for some time at 0° to 5° C. and then 4 parts of urea is added. The resultant clear solution is allowed to flow gradually into a solution of 11.0 parts of N-ethyl-N-(3-acetaminopropyl)-aminobenzene, 25 parts of water and 6 parts of concentrated hydrochloric acid at 0° to 5° C., stirred for two hours and 100 parts of ice is added to the reaction mixture. The whole is worked up by conventional methods and the dye obtained dyes cellulose acetate blue shades having excellent fastness to gas fume fading.

Further dyes are obtained from the following diazo component and coupling components:

| Example No. | Diazo component | Coupling components $C_3H_6$=propylene-1,3 | Shade of dyeing on cellulose acetate |
|---|---|---|---|
| 2 | $O_2N$—[thiazole]—$NH_2$ | phenyl-N(CH$_3$)(C$_3$H$_6$NHCOCH$_3$) | Reddish blue. |
| 3 | $O_2N$—[thiazole]—$NH_2$ | m-tolyl-N(CH$_3$)(C$_3$H$_6$NHCOCH$_3$) | Blue. |
| 4 | $O_2N$—[thiazole]—$NH_2$ | m-tolyl-N(C$_2$H$_5$)(C$_3$H$_6$NHCOCH$_3$) | Do. |

| Example No. | Diazo component | Coupling components C₃H₆=propylene-1,3 | Shade of dyeing on cellulose acetate |
|---|---|---|---|
| 5 | O₂N-[thiazole]-NH₂ | C₆H₄(N(C₄H₉)(C₃H₆NHCOCH₃)) | Reddish blue. |
| 6 | O₂N-[thiazole]-NH₂ | C₆H₃(CH₃)(N(C₄H₉)(C₃H₆NHCOCH₃)) | Blue. |
| 7 | O₂N-[thiazole]-NH₂ | C₆H₃(CH₃)(N(C₂H₄OCOCH₃)(C₃H₆NHCOCH₃)) | Do. |
| 8 | O₂N-[thiazole]-NH₂ | C₆H₃(CH₃)(N(C₂H₄OH)(C₃H₆NHCOCH₃)) | Do. |
| 9 | O₂N-[thiazole]-NH₂ | C₆H₃(Cl)(N(CH₃)(C₃H₆NHCOCH₃)) | Reddish blue. |
| 10 | O₂N-[thiazole]-NH₂ | C₆H₄(N(C₂H₄OCH₃)(C₃H₆NHCOCH₃)) | Blue. |
| 11 | O₂N-[thiazole]-NH₂ | C₆H₃(CH₃)(N(C₃H₆NHCOCH₃)(CH₂-CH(OCOCH₃)-CH₂OCOCH₃)) | Do. |
| 12 | O₂N-[thiazole]-NH₂ | C₆H₃(NHCOCH₃)(N(C₂H₄OCOCH₃)(C₃H₆NHCOCH₃)) | Greenish blue. |
| 13 | O₂N-[thiazole]-NH₂ | C₆H₄(N(C₄H₉)(C₃H₆NHCOCH₂CN)) | Reddish blue. |

We claim:

1. A dye of the formula:

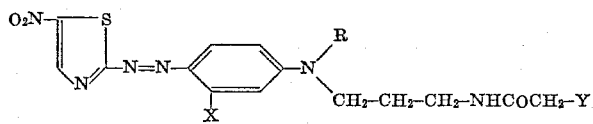

wherein:

R represents a group selected from the class consisting of alkyl having 1 to 4 carbon atoms, hydroxyethyl, acetoxyethyl, methoxyethyl and 2,3-diacetoxypropyl, X represents a member selected from the class consisting of hydrogen, chlorine, methyl and acetylamino, and Y represents a member selected from the class consisting of hydrogen and cyano.

2. The dye of the formula:

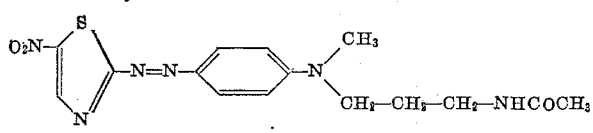

3. The dye of the formula:

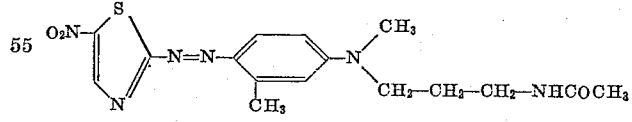

4. The dye of the formula:

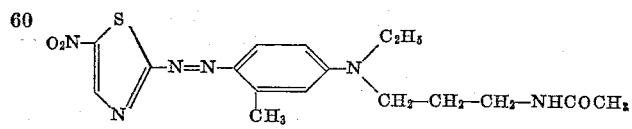

References Cited by the Examiner

UNITED STATES PATENTS 2,683,709   7/1954   Dickey et al. _____ 260—158

FOREIGN PATENTS 894,012   4/1962   Great Britain.

CHARLES B. PARKER, *Primary Examiner.*

DONALD M. PAPUGA, *Assistant Examiner.*